Nov. 14, 1961  C. J. KINSEY ET AL  3,008,768
WHEEL RIM
Filed March 21, 1958
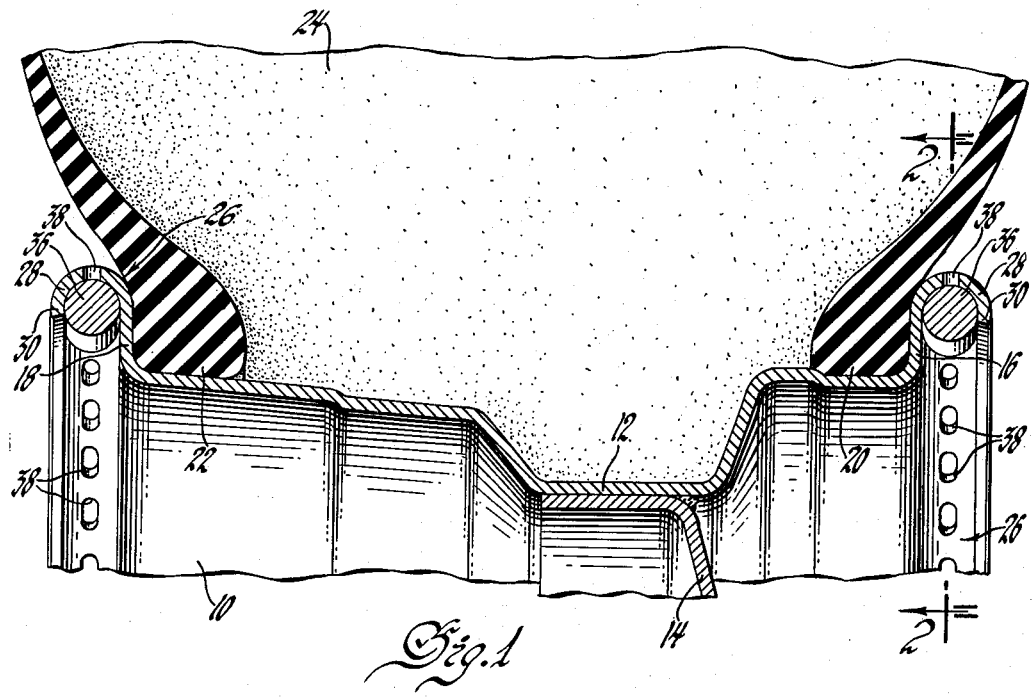
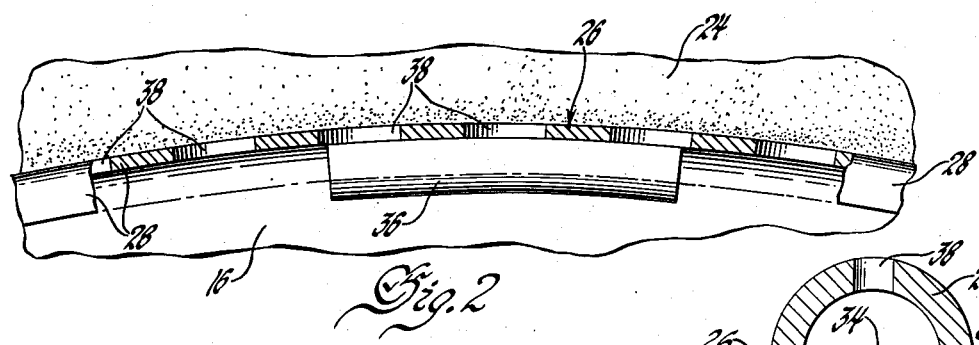
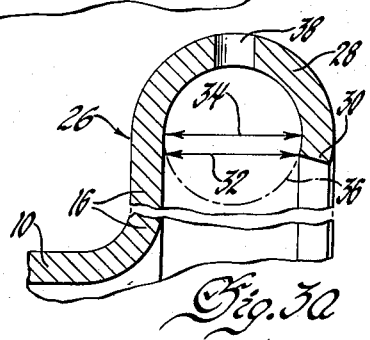
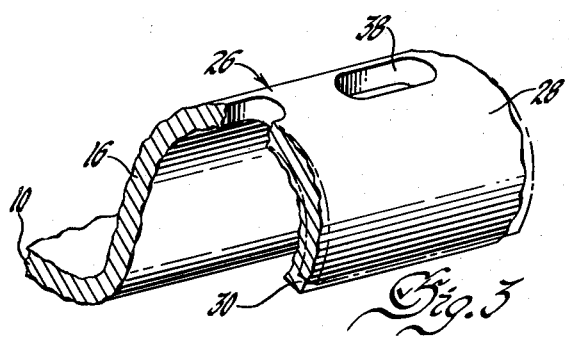
INVENTORS
Claude J. Kinsey &
William J. Volke
BY
L. D. Burch
ATTORNEY

United States Patent Office 3,008,768
Patented Nov. 14, 1961

3,008,768
WHEEL RIM
Claude J. Kinsey and William J. Volke, Detroit, Mich., assignors to General Motors Corporation, Detroit, Mich., a corporation of Delaware
Filed Mar. 21, 1958, Ser. No. 722,888
8 Claims. (Cl. 301—5)

This invention relates to wheel rims and more particularly to a means for balancing a wheel rim and tire assembly.

The usual method of balancing wheel rims includes the use of a series of lead weights having clips of some type attached thereto or integral therewith. The weight and clip assemblies are attached to the wheel rim at a particular point to overcome the unbalance of the wheel rim and tire assembly. Numerous problems have been involved in this type of wheel balancing, most notable being the use of lead for the balancing weights, in view of the apparent coming scarcity of lead, and further, the weight and clip assemblies are seldom reusable since, in removing the weights from the wheel rim, it is generally necessary to deform or break the attaching clip so that the weight can not be reapplied. In the usual wheel rim and tire assembly, it is often necessary to change the position of the balancing weights because of changes in the balance condition. The changes may result, for example, from replacing the tire or repairing a tire and adding the weight of a patch thereto, offsetting the balance condition of the wheel. A third disadvantage of the usual balancing weights is the necessity of special tools for mounting and removing the weights, making it difficult for anyone but an equipped mechanic to apply or remove the weights.

The device in which this invention is embodied comprises an improved wheel rim having an annular channel formed in the outer edge of the wheel rim flange, or channels in both the outer and inner wheel rim flanges. Balancing weights, of steel or some other readily available material, are receivable in the recess thus formed and may be snapped in or out with little difficulty. The weights are readily reusable since the removal of the weights from the wheel rim does not deform them in any manner. When tire changes or the like necessitate a rebalancing of the assembly it may be easily done without special tools or a great amount of effort. Thus, a great saving is accomplished in providing weights of a readily accessible material, in providing reusable balancing weights, and in the ease and economy in setting or removing weights, or changing the location of the balancing weights in the wheel rim.

In the drawings:

FIGURE 1 is a partial sectional view of the wheel rim and tire assembly showing the recesses formed in the inner and outer flanges and having balancing weights mounted therein.

FIGURE 2 is an elevational sectional view of the wheel rim of FIGURE 1 with parts broken away and in section, taken substantially along the line 2—2 of FIGURE 1 and looking in the direction of the arrows.

FIGURE 3 is an isometric view of a segment of the wheel rim flange of FIGURE 1 showing the recess in its normal and expanded positions.

FIGURE 3a is an enlarged view of a portion of FIGURE 1 showing the recess formed in the rim flange.

Referring more particularly to the drawings, FIGURE 1 shows a wheel rim and tire assembly embodying the present invention. The wheel rim 10 has the usual drop center portion 12 welded to the wheel spider 14, and has a pair of flanges 16 and 18 at the inner and outer edges thereof to retain the tire beads 20 and 22 of the tire 24 mounted on the wheel assembly.

The flange 16 terminates in an annular channel 26 which opens toward the axis of rotation of the wheel rim. FIGURES 1, 2, and 3 show the channel of semi-circular cross section, but this invention is not restricted to any particular cross section. The wall 28 forming the annular channel, in this instance slightly more than semi-circular in cross section, extends past the center line of the semi-circular portion as at 30, providing an annulus opening 32 of less width than the width 34 of the annular channel 1 shown more clearly in FIGURE 3a. In the event a different cross section is used, it is necessary that the opening to the channel be of less width than the maximum interior width of the channel.

As is illustrated in FIGURE 1, the wheel rim may be provided with annular channels in both the inside and outside flanges 16 and 18 of the wheel rim, or may be formed on just one of the wheel rim flanges, the other flange being formed in any conventional manner. When both flanges are formed to provide channels, the construction and use are the same.

The balancing weight 36 is cut from a length of steel bar stock, the length of bar stock having been formed to the diameter of the annular channel in the plane normal to the axis of rotation of the wheel rim. The bar stock is of the same cross section, or substantially the same cross section, as the interior of the channel, such that the maximum width of the bar stock is greater than the width of the channel entrance. The bar stock may be cut into suitable lengths corresponding to predetermined weights.

A plurality of perforations 38 are formed in the annular channel opposite the opening so that any accumulation of dirt and water, or other foreign substance, that may settle in the annular channel, may be easily removed. The slots 38 further provide a means for removing the balancing weights.

In balancing a wheel rim and tire assembly, any well known method may be used to find the point of unbalance and the amount of unbalance, and the operator selects a suitable length of bar stock to be used as a balancing weight. The weight is placed against the opening of the annular channel and snapped into place, bending the extended portion 30 of the channel slightly outwardly, as shown in phantom in FIGURE 3, to allow passage of the weight into the channel. The extended portion of the channel returns to its normal position and retains the weight in the channel. In order to remove the balancing weight, for relocation purposes or the like, a tool may be inserted through the slots or perforations in the channel and the balancing weight tapped out of the channel. Again, the extending portion 30 expands outwardly to allow passage of the weight through the opening of the channel.

Thus, the weights may be inserted at any point on the wheel rim, and are retained in the channel without the use of attaching clips or other fastening means. The weights may be easily removed and relocated when necessary, and may be used over and over again.

We claim:

1. Wheel balancing means comprising a wheel rim, an outer edge of said wheel rim forming a circumferential channel, said channel having a restricted opening directed toward the axis of rotation of said wheel rim, and balancing weights insertable in said channel in a radial direction, said weights being retained in said channel by said restricted opening of said channel.

2. The wheel balancing means set forth in claim 1 and having a channel formed in both the inner and outer edges of said wheel rim.

3. A vehicle wheel rim having an edge portion preformed to provide a circumferential channel of substantially semi-circular cross section, the outer wall of said channel extending past the center line thereof and said channel opening radially inwardly of said wheel rim, cylindrical balancing weights receivable in said channel and insertable in a radial direction and retained therein by said extending outer channel wall, said weights being formed from a rod-like member having the same diameter as the cross section of said channel, and a plurality of slots being formed in said channel for ease in removal of said weights to prevent the accumulation of dirt and water in said channel.

4. Wheel balancing means comprising a wheel rim having a tire retaining flange, said flange being formed to provide an annular inwardly opening recess, said recess having the opening thereof of less width than the maximum width of said recess, balancing weights receivable in said recess and of substantially the same cross section as the cross section of said recess, said weights being insertable in said recess in a generally radial direction and retained in said recess by the restricted opening thereof, and a plurality of perforations in said flange and communicating with said recess for preventing the accumulation of dirt and water in said recess.

5. Wheel balancing means comprising a wheel rim, a wall forming an annular recess in the outer edge of said rim, the entrance of said recess being of less width than the width of said recess within said wall, and balancing weights radially receivable in said annular recess and anywhere along said annular recess, said balancing weights being of the same width as the width of said recess within said wall and retained therein by said wall.

6. Wheel balancing means comprising a wheel rim, a circumferential channel formed in the outboard edge of said wheel rim, said channel having a restricted opening directed toward the axis of rotation of said wheel rim and having an expandable outer wall, balancing weights receivable in said channel and insertable in a radial direction in said channel and cut from rod-like members having substantially the same cross section as the cross section of said channel and formed to the diameter of said channel in the plane normal to the axis of rotation of said wheel rim, said weights being retained in said channel by said expandable outer wall, and a plurality of slots formed in said channel for ease in removal of said weights and to prevent the accumulation of dirt and water in said channel.

7. Wheel balancing means as set forth in claim 6 wherein the inboard and outboard edges of said wheel rim are provided with inwardly directed circumferential channels, and balancing weights receivable in said channels.

8. Wheel balancing means comprising a wheel rim, a wall forming an annular recess in the outer edge of said rim, the entrance of said recess being of less width than the width of said recess within said wall, and balancing weights radially receivable in said annular recess and anywhere along said annular recess, said balancing weights having portions being of the same width as the width of said recess within said wall and retained therein by said wall.

References Cited in the file of this patent

UNITED STATES PATENTS

| | | |
|---|---|---|
| 2,185,017 | Purvis | Dec. 26, 1939 |
| 2,237,501 | Purvis | Apr. 8, 1941 |
| 2,308,904 | Wood | Jan. 19, 1943 |
| 2,440,858 | Hollerith | May 4, 1948 |

FOREIGN PATENTS

| | | |
|---|---|---|
| 627,995 | France | June 20, 1927 |
| 282,965 | Great Britain | Jan. 5, 1928 |
| 380,791 | Italy | June 4, 1940 |